INVENTORS
Norman D. Lawless,
William M. Grooms &
BY Melvin J. Racine

Hugh L. Fisher
ATTORNEY

United States Patent Office 3,329,893
Patented July 4, 1967

3,329,893
ELECTRICAL DEVICE FOR MEASURING THE RATE OF AN OCCURRENCE OF AN EVENT
Norman D. Lawless, Flint, William M. Grooms, Clio, and Melvin J. Racine, Flint, Mich., assignors to General Motors Corporation, Detroit, Mich., a corporation of Delaware
Filed July 23, 1964, Ser. No. 384,759
6 Claims. (Cl. 324—70)

This invention relates to electrical measuring apparatus for providing an indication of the rate of occurrence of an event and, more particularly, to such apparatus as may be particularly useful as a speedometer or tachometer.

Various type of devices which are essentially frequency meters have been proposed for use as tachometers or speedometers. Basic to these devices is the presentation of an indication of the rate of occurrence of a particular event. The present invention provides means by which the rate of occurrence of an event, such as the revolution of a wheel or crank shaft or any other recurring event, may be indicated by the angular displacement of a rotatable element such as an armature. In general, this is accomplished by the combination of generator means associated with the means through which the recurring event is manifested for producing a train of voltage pulses, the frequency of which is related to the rate of occurrence of the event. The combination further includes receiving apparatus in the form of meter means connected to receive the pulse train and to produce a number of magnetic field components, the resultant of which is angularly displaced in accordance with the frequency of the pulse train.

A particular embodiment of the present invention is described in the following specification which is to be taken with the accompanying drawings of which:

The invention is described in the following specification with reference to a specific embodiment in the form of a tachometer. This tachometer includes means for producing a train of unidirectional voltage pulses, the frequency of which is variable with the speed of a motive power source such as an automobile engine, and meter means connected to receive the pulse train and to produce a resultant magnetic field, the angular position or displacement of which is related to the frequency of the pulse train. Briefly, the meter means includes a plurality of electromagnetic coils which are effective to produce respective magnetic fields along axes which are angularly related according to a predetermined plan, and a rotatably supported magnetic armature which is effective to be aligned with the resultant magnetic field. One of the electromagnetic coils is connected to receive the pulse train and to produce a magnetic field having a magnitude which is related to the average value of the pulse train. Additional coils are connected to produce respective magnetic fields having magnitudes which are related to the frequency of the pulse train and are, thus, variable in magnitude with the speed of the engine. This frequency magnitude relation is established by means of capacitor means connected with the coils such that the voltage across the coils is variable with the frequency of the pulse train. It will be noted that the term "magnetic field" is used herein in a generic sense, without distinction between permanent magnet and electromagnet sources.

Figure 1:
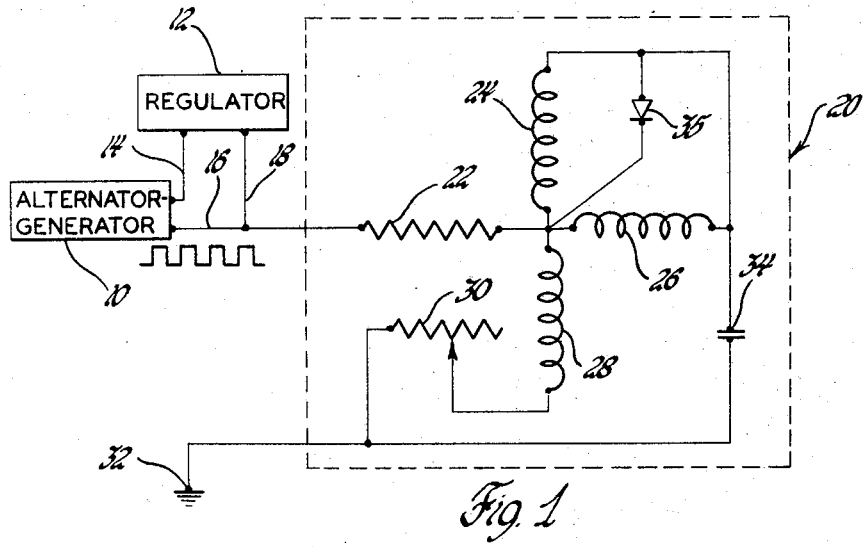
FIGURE 1 is a schematic diagram of the meter means indicating the connection thereof with the source of the pulse train.

Referring to FIGURE 1, the means for producing the pulse train is shown in the form of an alternator-generator 10 of the type manufactured by the Delco-Remy Division of General Motors Corporation. This alternator-generator is driven by the automobile engine, not shown, such that the generated frequency is therefore directly proportional to engine speed and varies over an approximate frequency range of, for example, 35 to 2300 c.p.s. The alternator-generator 10 is shown connected to a voltage regulator 12 via conductors 14, 16 and 18. The waveform appearing on conductor 16 is a train of unidirectional voltage pulses as indicated in FIGURE 1. This pulse train is connected through conductor 16, as shown, to a meter means 20 which produces a resultant magnetic field which is rotated from a reference orientation through an angle related to the frequency of the waveform. The meter means 20 is shown to include a current limiting resistor 22 having one side connected to the alternator-generator 10 through conductor 16 and the other side connected jointly to one side of each of a plurality of electromagnetic coils 24, 26 and 28. The circuit through coil 28 is completed through an adjustable potentiometer 30 to a point of reference potential shown as ground 32. Coil 28 is thus effectively connected across the alternator-generator 10, such that the magnitude of the electromagnetic field produced by coil 28 is related to the average value of the pulse train produced by alternator-generator 10. The other sides of coils 24 and 26 are connected to one terminal of a capacitor 34. The other terminal of the capacitor 34 is connected to ground 32 as shown. It can be seen that there is formed a series circuit connected across the alternator-generator 10 comprising the combination of resistor 22, the parallel combination of coils 24 and 26, and capacitor 34. According to classical circuit theory it may be seen that as the frequency of the pulse train produced by alternator-generator 10 increases, the voltage across the inductive coils 24 and 26 increases while the voltage across the non-linear capacitor 34 decreases. To limit the current through the coils 24 and 26 to one direction only, a diode 35 is connected in shunt relation with the coils 24 and 26 with the preferred direction of conduction being such that the diode 35 is non-conductive to the positive pulse train from alternator-generator 10 but conductive to discharge current from capacitor 34 through a path to ground which includes coil 28 and potentiometer 30.

Briefly describing the operation of the circuit shown in FIGURE 1, coil 28, being connected across the alternator-generator 10 in effect, produces a reference field of a substantially constant magnitude along the magnetic axis thereof. Upon the occurrence of a voltage pulse, charging current for capacitor 34 flows equally through coils 24 and 26 and through the capacitor 34 to ground 32. As the alternator-generator voltage returns to zero, capacitor 34 discharges through diode 35 which shunts coils 24 and 26. Current through coils 24 and 26 thus flows in only one direction and increases with frequency. The field produced by coil 24 is in opposition to that produced by coil 28, and the field produced by coil 26 is at right angles to the sum of the fields produced by coils 24 and 28. Thus, the resultant magnetic field is rotated from a position nearly in alignment with the axis of coil 28, counter-clockwise toward the axis of coil 24 as the frequency increases.

Figure 2:
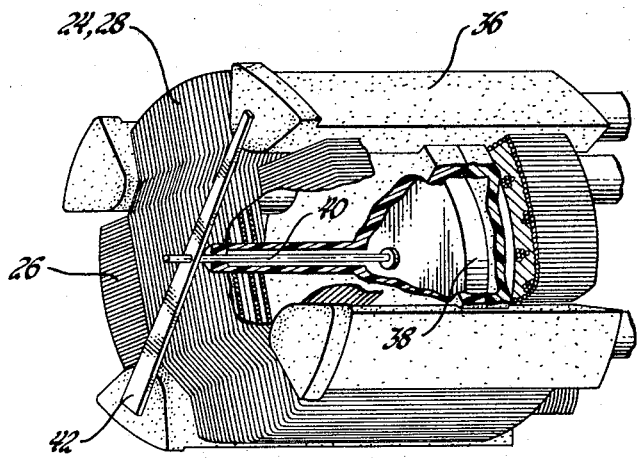
FIGURE 2 is a three-quarter view, partly in cross-section, of a unit indicating a preferred construction for the metering portion of the invention.

Referring now to FIGURE 2, the coils 24, 26 and 28 are shown mounted on a support means or coil form 36 which may be made of a suitable non-conductive material such as plastic. As indicated in FIGURE 2, coils 24 and 28 are wound on the form 36 so as to have a common magnetic axis, but so as to produce field components of opposite sense along the axis when wired as indicated in FIGURE 1. Coil 26 is wound on the form 36 with the magnetic axis thereof at a 90° angle from the axis of coils 24 and 28. It is clear from FIGURE 2 that the intersection of the axes is a right angle intersection at the center of the coils. The unit shown in FIGURE 2 also includes a permanent magnet armature 38 in the form of a flat round disc which is magnetized with the poles diametrically opposite one another. Armature 38 is rotatably supported at the center of the coils 24, 26 and 28 by means of a spindle shaft 40 which is provided with suitable bearing means. The shaft 40 protrudes toward the left side of the figure from the coils 24, 26 and 28 to support an indicator needle 42 which is, of course, rotated with the armature 38. As is apparent to those skilled in the art, the magnetic flux path for the coils 24, 26 and 28 includes armature 38, but is for the most part an air path as opposed to the more common iron path. This particular construction, which is known as an air core construction, provides the advantage of eliminating operational errors caused by magnetic material in the flux path and improper positioning of pole structures among other things.

Figure 3:
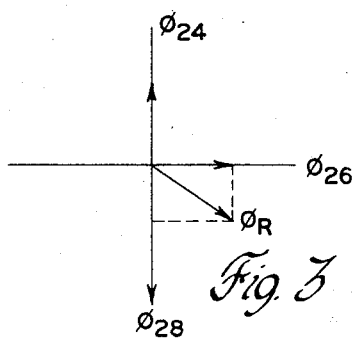
FIGURE 3 is a flux vector diagram used in describing the operation of the invention.

Referring now to FIGURE 3, the operation of the invention as shown in FIGURES 1 and 2 will be described in greater detail. According to the disposition of the coils 24, 26 and 28 shown in FIGURES 1 and 2 it can be seen that the magnetic fields produced by coils 24 and 28 are in opposing directions along the ordinate which represents the common axis of coils 24 and 28. Flux vector $\phi_{24}$ representing the magnitude of the field produced by coil 24 is in the north direction, looking at the drawing, while $\phi_{28}$ representing the magnetic field produced by coil 28 is in the south direction. The field produced by coil 26 is shown in the east direction by the flux vector $\phi_{26}$. As previously mentioned, the field produced by coil 28 is proportional to the average value of the pulse train produced by alternator-generator 10 and is, thus, substantially constant, assuming the engine driving alternator-generator 10 is running. However, the flux vectors $\phi_{24}$ and $\phi_{26}$ increase in magnitude with increasing frequency of the pulse train produced by alternator-generator 10 inasmuch as the voltage drop across coils 24 and 26 increases with increasing frequency due to the action of capacitor 34. Thus, as shown in FIGURE 3, the angular displacement of the resultant flux vector $\phi_R$ is determined by a straightforward vector addition. It can be seen that at a low speed, as indicated in FIGURE 3, the length of vectors $\phi_{24}$ and $\phi_{26}$ is less than that of $\phi_{28}$ and the resultant $\phi_R$ lies between $\phi_{28}$ and $\phi_{26}$. When the frequency of the pulse train produced by alternator-generator 10 is such that $\phi_{24}$ equals $\phi_{28}$, the resultant flux vector $\phi_R$ will align with $\phi_{26}$. With further increase in frequency, $\phi_{24}$ grows larger than $\phi_{28}$ and the resultant will continue to move counterclockwise toward the north direction. As previously mentioned, the magnetic armature 38, being rotatably disposed at the intersections of the axes of the coils 24, 26 and 28 is jointly influenced by the magnetic field and will be rotated to a position of alignment with the resultant flux vector $\phi_R$. The needle 42, being rotated with the armature 38 by means of shaft 40, may be used in connection with a suitably calibrated dial face to provide a direct indication of the frequency of the pulse train produced by alternator-generator 10. This, of course, is also an indication of the speed of rotation of the engine which drives the alternator-generator 10.

While the foregoing description of the invention has been directed toward a specific tachometer circuit, it is to be understood that the invention is not to be so limited. For a definition of the invention, reference should be had to the appended claims.

What is claimed is:

1. In combination, means for producing a train of voltage pulses the frequency of which is variable over a predetermined range, meter means connected to receive the pulse train and to produce a resultant magnetic field the angular displacement of which is related to the frequency of the pulse train, the meter means comprising first and second parallel connected coil means for producing first and second magnetic fields along first and second axes respectively, means for producing a third magnetic field along a third magnetic axis and having a substantially constant magnitude, the first and second coil means being disposed such that the third magnetic field is opposing the first magnetic field and the second magnetic axis intersects the first axis at a predetermined angle, capacitor means connected in series circuit with the pulse producing means and the parallel-connected coil means thereby to vary the magnitudes of the first and second magnetic fields in the same sense as a function of the frequency of the pulse train, and rotatably supported armature means responsive to the magnetic fields to be aligned with the resultant thereof.

2. In combination, means for producing a train of unidirectional voltage pulses the frequency of which is variable over a predetermined range, meter means connected to receive the pulse train and to produce a resultant magnetic field the angular displacement of which is related to the frequency of the pulse train, the meter means comprising first and second coil means for producing first and second magnetic fields along first and second axes respectively, one end of each of the first and second coil means being connected to receive the pulse train, capacitor means having two terminals, one terminal being connected to ground and the other terminal being connected to the other end of each of the first and second coil means whereby the magnitudes of the first and second magnetic fields vary in the same sense with variation in the frequency of the pulse train, means for producing a third magnetic field along a third magnetic axis and having a substantially constant magnitude, the coil means being disposed such that first and third magnetic fields are in opposition, means for providing a discharge path for the capacitor means independent of the first and second coil means, and rotatably supported armature means responsive to the magnetic fields to be aligned with the resultant thereof.

3. Apparatus for indicating the rate of occurrence of an event including, means for producing a train of unidirectional voltage pulses at a frequency related to the frequency of occurrence of the event, support means, first and second coils for producing first and second magnetic fields along respective first and second axes, the coils being disposed on the support means such that the axes intersect at a predetermined angle, one end of each of the first and second coils being connected to the signal producing means, capacitor means having two terminals, one terminal being connected to a point of reference potential and the other terminal being connected to the other end of the coils to provide current flow through the coils at a magnitude related to the frequency of the pulse train, a third coil for producing a third magnetic field along a third axis, the third coil being disposed on the support means such that the third magnetic field is in opposition to the first magnetic field, the third coil being connected across the signal producing means to produce a magnetic field related in magnitude to the average value of the pulse train, unidirectionally conductive means connected to the capacitor for providing a discharge path independent of the first and second coils, and a permanent magnetic armature rotatably mounted on the support means within the magnetic fields and responsive to the fields to be aligned with the resultant thereof.

4. Apparatus as defined in claim 3 wherein the predetermined angle is substantially 90°.

5. In combination, an alternator-generator adapted to be driven by a motive power source to produce a train of unidirectional voltage pulses the frequency of which is related to the speed of the motive power means, meter means connected to receive the pulse train and to produce a resultant magnetic field, the angular displacement of which is related to the frequency of the pulse train, the meter means comprising support means, first and second coils disposed on the support means for producing first and second magnetic fields along first and second magnetic axes, respectively, a third coil mounted on the support means for producing a third magnetic field along a third axis, the second and third coils being disposed on the support means such that the third magnetic field opposes the first magnetic field and the second magnetic field is at right angles to the first and third magnetic axes, one end of each of the first, second and third coils being connected to the alternator-generator to receive the pulse train, a capacitor having two terminals, one terminal being connected to ground and the other terminal being connected to the other side of the first and second coil means, whereby the magnitude of the first and second magnetic fields varies with variations in the frequency of the pulse train, the other end of the third coil being connected to ground whereby the magnitude of the third magnetic field is related to the average value of the pulse train, a diode connected between said other terminal of the capacitor and said one end of the coils for providing a discharge path independent of the first and second coils, and a permanent magnet armature rotatably disposed on the support means at the intersection of the first, second and third magnetic axes and responsive to the magnetic fields to be aligned with the resultant thereof 6. An electric tachometer unit comprising a non-magnetic coil support, first and second coils wound upon the support to have a common axis passing substantially through the center of the support, a third coil wound upon the support to have an axis orthogonal to said common axis and intersecting said common axis substantially centrally of the coils, one end of each of the coils being adapted for connection to a source of variable frequency electrical signals, the other end of the second coil being grounded, a capacitor connecting the other ends of the first and third coils to ground, a magnetic armature rotatably mounted substantially centrally of said support for rotation in the plane of said axes, and indicator means mechanically connected to the armature for indicating the angular position thereof.

References Cited
UNITED STATES PATENTS

| | | | |
|---|---|---|---|
| 2,181,960 | 12/1939 | Bacon | 324—140 |
| 2,849,679 | 8/1958 | Bartlett | 324—146 |
| 3,202,910 | 8/1965 | Fathauer | 324—70 |

WALTER L. CARLSON, *Primary Examiner.*

RUDOLPH V. ROLINEC, *Examiner.*

M. J. LYNCH, *Assistant Examiner.*